(12) United States Patent
Wang et al.

(10) Patent No.: US 10,997,609 B1
(45) Date of Patent: May 4, 2021

(54) BIOMETRIC BASED USER IDENTITY VERIFICATION

(71) Applicant: Alipay Labs (Singapore) Pte. Ltd., Singapore (SG)

(72) Inventors: Hai Wang, Hangzhou (CN); Ruoyu Li, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/086,280

(22) Filed: Oct. 30, 2020

(30) Foreign Application Priority Data

Jan. 6, 2020 (SG) .......................... SG10202000100

(51) Int. Cl.
*G06Q 99/00* (2006.01)
*G06Q 30/00* (2012.01)
(Continued)

(52) U.S. Cl.
CPC ..... *G06Q 30/0185* (2013.01); *G06F 16/2237* (2019.01); *G06F 16/24556* (2019.01); *G06F 16/24578* (2019.01); *G06F 16/285* (2019.01); *G06F 16/9535* (2019.01); *G06K 9/00288* (2013.01); *G06K 9/00617* (2013.01);
(Continued)

(58) Field of Classification Search
CPC ............. G06K 9/6215; G06K 9/00288; G06K 9/00617; G06Q 30/02; G06Q 30/0185; G06Q 40/02; G06F 16/24578; G06F 21/32; G06F 16/285; G06F 16/24556; G06F 16/2237; G06F 16/9535; H04L 61/2007;
(Continued)

(56) References Cited

U.S. PATENT DOCUMENTS

2007/0162337 A1 * 7/2007 Hawkins ............ G06Q 30/0236 705/14.27
2015/0347734 A1 12/2015 Beigi
2020/0184053 A1 * 6/2020 Kursun .............. G06K 9/00926

FOREIGN PATENT DOCUMENTS

WO WO 2016058520 4/2016

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Charlotte M Baker
(74) *Attorney, Agent, or Firm* — Fish & Richardson P.C.

(57) ABSTRACT

A computer-implemented method includes obtaining user data associated with a first user, the user data including biometric data associated with the first user and personal information of the first user; conducting a biometric similarity search in a historical user database based on the biometric data; determining, based on the biometric similarity search, that multiple historical users have similar biometric data to the first user; retrieving corresponding personal information of each of the multiple historical users; generating a respective personal information similarity score for each of the multiple historical users; and identifying, as the first user, a historical user of the multiple historical users, the personal information similarity score corresponding to the identified historical user indicating a higher similarity than the personal information similarity scores corresponding to other historical users of the multiple historical users.

21 Claims, 5 Drawing Sheets

(51) Int. Cl.
*G10L 17/18* (2013.01)
*G06F 16/9535* (2019.01)
*G06F 16/2457* (2019.01)
*G06F 16/28* (2019.01)
*G06F 16/22* (2019.01)
*G06F 16/2455* (2019.01)
*G06N 3/04* (2006.01)
*G06N 3/08* (2006.01)
*H04L 29/12* (2006.01)
*G06K 9/00* (2006.01)
*G10L 17/06* (2013.01)
*G10L 17/02* (2013.01)
*G06Q 40/02* (2012.01)

(52) U.S. Cl.
CPC ............. *G06N 3/04* (2013.01); *G06N 3/08* (2013.01); *G06Q 40/02* (2013.01); *G10L 17/02* (2013.01); *G10L 17/06* (2013.01); *G10L 17/18* (2013.01); *H04L 61/2007* (2013.01); *H04L 61/307* (2013.01)

(58) Field of Classification Search
CPC .......... H04L 61/307; G06N 3/04; G06N 3/08; G10L 17/02; G10L 17/06; G10L 17/18
USPC ............ 705/318, 7.28, 67, 64, 14.27, 14.35, 705/14.36, 14.37, 14.39; 707/723, 707/999.107, 771; 709/204; 713/186
See application file for complete search history.

(56) References Cited

OTHER PUBLICATIONS

Nakamoto, "Bitcoin: A Peer-to-Peer Electronic Cash System," www.bitcoin.org, 2005, 9 pages.

Otto et al., "Clustering Millions of Faces by Identity," IEEE Transactions on Pattern Analysis and Machine Intelligence, Feb. 2018, 20(2):289-303.

Schroff et al., "FaceNet: A unified embedding for face recognition and clustering," 2015 IEEE Conference on Compute Vision and Pattern Recognition (CVPR), Jun. 2015, 10 pages.

* cited by examiner

BIOMETRIC BASED USER IDENTITY VERIFICATION

CROSS-REFERENCE TO RELATED APPLICATIONS

This application claims priority to Singapore Patent Application No. 10202000100Y, filed on Jan. 6, 2020, which is hereby incorporated by reference in its entirety.

FIELD OF INVENTION

The present disclosure relates broadly, but not exclusively, to methods and devices for biometric-based user identity verification.

BACKGROUND

Electronic wallet (or e-wallet) related financial services are under worldwide stringent regulations. For example, regulators in many countries and regions set a limit to the number of accounts that a person can register with a same electronic wallet service provider to prevent financial risks such as money laundering and fraud. Identity verification is thus required for electronic wallet service providers or other financial or non-financial institutions to verify their users' identities so as to comply with the regulations and prevent financial risks.

Currently, a user's identity is mainly verified via either a short message service (SMS) one time password (OTP) sent to a mobile phone number provided by the user, or a verification email sent to an email account provided by the user. However, these identity verifications are not accurate, as phone numbers, email addresses or similar information cannot uniquely identify a person. For example, a person can purchase numerous phone numbers or register numerous email accounts, and use them to register different electronic wallet accounts under different names on an electronic wallet platform. With the current phone number based or email address based identity verifications, the electronic wallet platform may verify the same person using different names as different users, since the phone numbers or email accounts are valid. Such inaccurate identity verifications will cause the electronic wallet platform to authorize the registrations of the different electronic wallet accounts, which in turn will cause financial risks.

SUMMARY

According to a first embodiment of the present disclosure, there is provided a device for user identity verification. The device comprises a processor and a memory including computer program code. The memory and the computer program code are configured to, with the processor, cause the device to: obtain a set of user data associated with a user, the user data including biometric data and personal information of the user, wherein the biometric data includes a face image of the user, and wherein the personal information includes the user's email address, name, phone number, Internet Protocol (IP) address, and/or equipment identifier number; conduct a face search in a historical user database based on the face image of the user; if the face search returns no result, identify the user as a new user, and if the face search returns one or more similar faces of historical users, retrieve a list of the historical users and corresponding personal information, generate a similarity score by quantifying similarity between personal information of each historical user in the list and that of the user, and identify the user as a historical user of the list of the historical users that has a highest similarity score among the similarity scores of the list of the historical users.

According to a second embodiment of the present disclosure, there is provided a computer-implemented method for user identity verification. The method comprises: obtaining a set of user data associated with a user, the user data including biometric data and personal information of the user, wherein the biometric data includes a face image of the user, and wherein the personal information includes the user's email address, name, phone number, Internet Protocol (IP) address, and/or equipment identifier number; conducting a face search in a historical user database based on the face image of the user; if the face search returns no result, identifying the user as a new user, and if the face search returns one or more similar faces of historical users, retrieving a list of the historical users and corresponding personal information, generating a similarity score by quantifying similarity between personal information of each historical user in the list and that of the user, and identifying the user as a historical user of the list of the historical users that has a highest similarity score among the similarity scores of the list of the historical users.

According to a third embodiment of the present disclosure, there is provided a system for user identity verification. The system comprises an input device configured to input user data; a user identity verification device configured to: obtain a set of user data associated with a user from the input device, the user data including biometric data and personal information of the user, wherein the biometric data includes a face image of the user, and wherein the personal information includes the user's email address, name, phone number, Internet Protocol (IP) address, and/or equipment identifier number; conduct a face search in a historical user database based on the face image of the user; if the face search returns no result, identify the user as a new user, and if the face search returns one or more similar faces of historical users, retrieve a list of the historical users and corresponding personal information, generate a similarity score by quantifying similarity between personal information of each historical user in the list and that of the user, and identify the user as a historical user of the list of the historical users that has a highest similarity score among the similarity scores of the list of the historical users; and a communication device configured to transmit a user identity verification result to the user.

BRIEF DESCRIPTION OF THE DRAWINGS

Embodiments and implementations are provided by way of example only, and will be better understood and readily apparent to one of ordinary skill in the art from the following written description, read in conjunction with the drawings, in which.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DETAILED DESCRIPTION

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "obtaining", "conducting", "identifying", "retrieving", "quantifying", "extracting", "clustering", "grouping", "indexing", "constructing", "searching", "locating", "creating", "calculating", "summing", "inputting", "outputting" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the specification.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Embodiments of the present disclosure provide devices, methods and systems that utilises biometric data, which is unique and directly indicative of users' identities, as a key factor to improve accuracy of users' identity verifications. By using biometric based user identity verification in conjunction with personal information based similarity quantification, the present devices, methods and systems can accurately verify the same person using different names with different phone numbers, email accounts or other different personal information to register different accounts with a financial service provider at different points in time as a same user, thereby recognising suspicious users and accounts and flagging abnormalities to the financial service provider so as to reduce risks and avoid frauds.

Biometric data refers to distinctive, measurable characteristics used to label and describe individuals, which include physiological characteristics and behavioural characteristics. Physiological characteristics are related to the body of a person, which include face recognition, iris recognition, retina, fingerprint, palm veins, palm print, hand geometry, odour/scent, etc. Behavioural characteristics are related to the pattern of behaviour of a person, including voiceprint, typing rhythm, gait, etc.

In the present disclosure, embodiments are provided with regards to biometric data such as face images. It is appreciable to those skilled in the art that other types of biometric data as mentioned above can also be used in the devices and methods as described herein.

Figure 1:
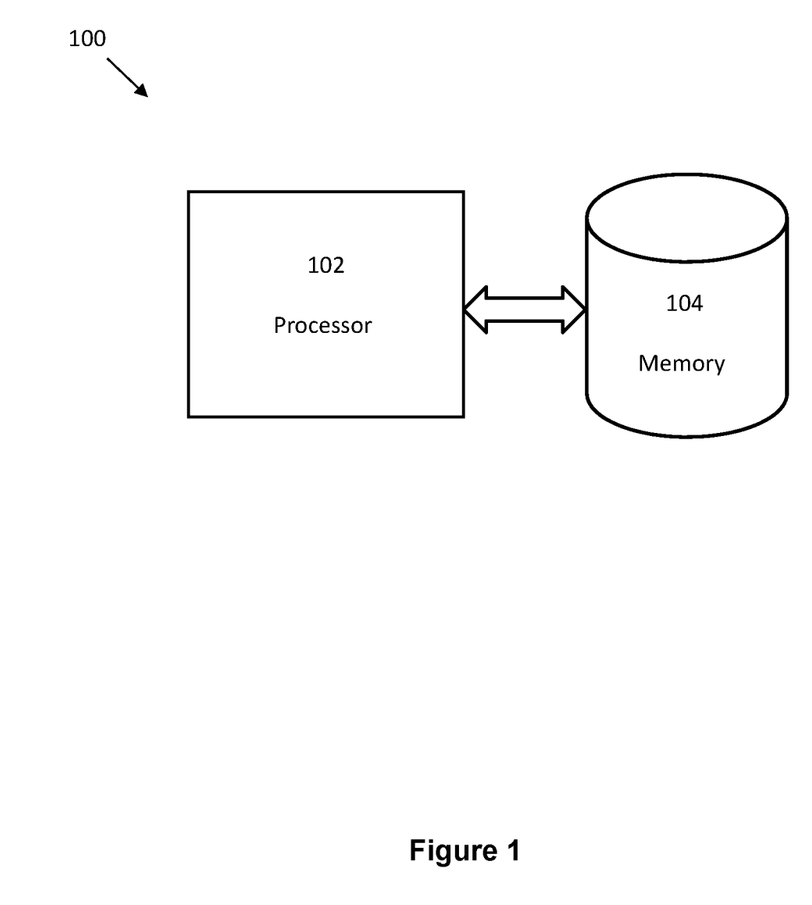
FIG. 1 is a schematic diagram of a device for user identity verification, according to an embodiment.

FIG. 1 illustrates a schematic diagram of a device 100 for user identity verification according to an embodiment of the present disclosure. The device 100 at least includes a processor 102 and a memory 104. The processor 102 and the memory 104 are interconnected. The memory 104 includes computer program code (not shown in FIG. 1). The memory 104 and the computer program code are configured to, with the processor 102, cause the device 100 to perform the steps for user identity verification as described in the present disclosure. Details of the steps will be described below with reference to FIG. 3, which depicts a flow chart illustrating a method 300 for user identity verification according to an embodiment.

Figure 2:
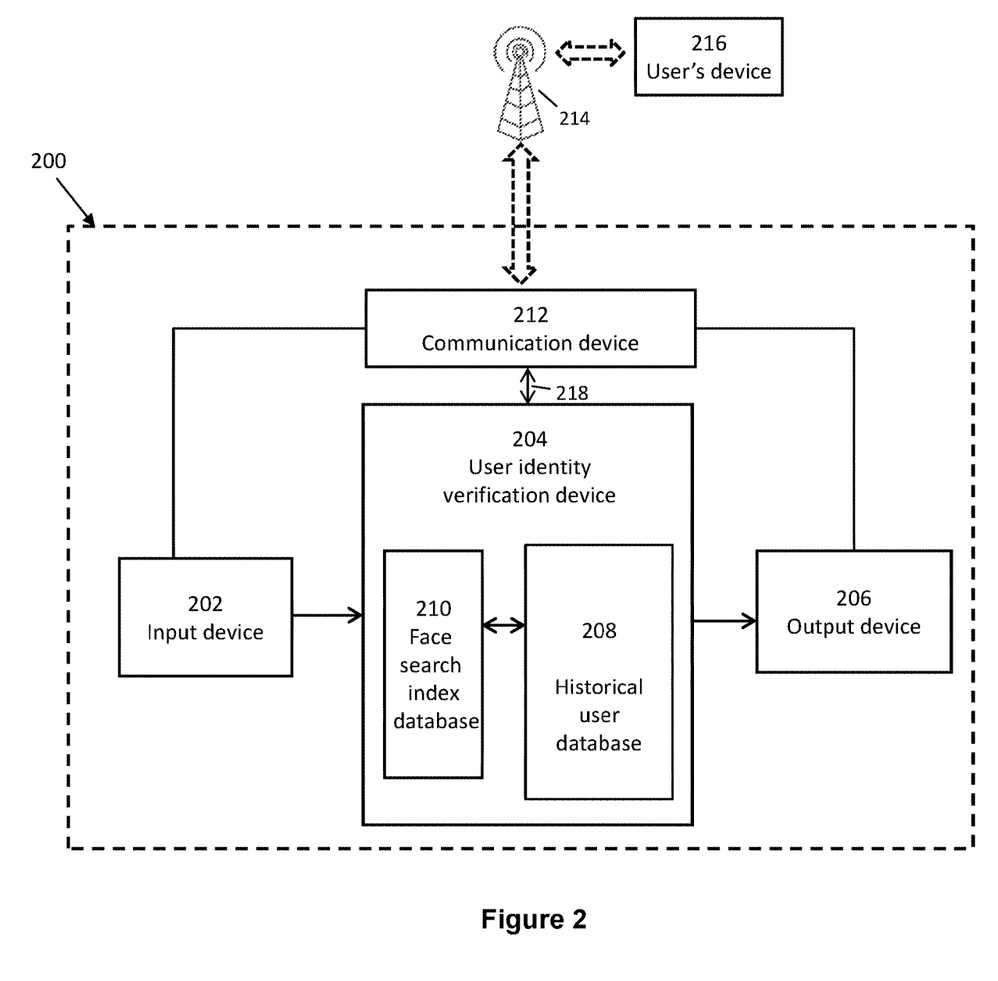
FIG. 2 is a schematic diagram of a system for user identity verification, according to an embodiment.

The device 100 for user identity verification can be implemented as a user identity verification device 204 in an exemplified system 200 for user identity verification as shown in FIG. 2, in accordance with an embodiment. The user identity verification device 204 can be implemented at a server of a financial service provider or any organisation that requires user identity verification.

As shown in FIG. 2, in addition to the user identity verification device 204, the system 200 can include an input device 202, an output device 206, and a communication device 212. The communication device 212 can be coupled to the input device 202, the output device 206 and the user identity verification device 204. The system 200 can be implemented as a server of a financial service provider or any organisation that requires user identity verification.

The input device 202 may include one or more of a camera, a microphone, a keyboard, a mouse, a stylus, etc. that can receive input from an administrator (not shown) of the system 200 of the financial service. The output device 206 may include one or more of a visual display unit (monitor), speakers, etc that present output to the administrator.

In some embodiments, when a user is registering an account with the financial service provider, the input device 202 and the communication device 212 can facilitate the administrator of the system 200 of the financial service provider to conduct a manual observation in addition to the methods for user identity verification described below and shown in FIGS. 3 and 4 to verify the user's identity. Such a manual observation can be an optional and/or additional step to identify the user for anti-spoofing purposes. For example, the administrator may use the communication device 212 to initiate 218 a live video chat with the user using his/her device 216 and use the input device 202 to ask the user to do random face expressions. The user's face expressions can then be shown to the administrator on the output device 206 for the administrator to determine whether a face image provided by the user is a spoofed image. Such a live video chat between the administrator of the system 200 and the user may be a communication via a base station 214 or via an Internet connection.

Figure 3:
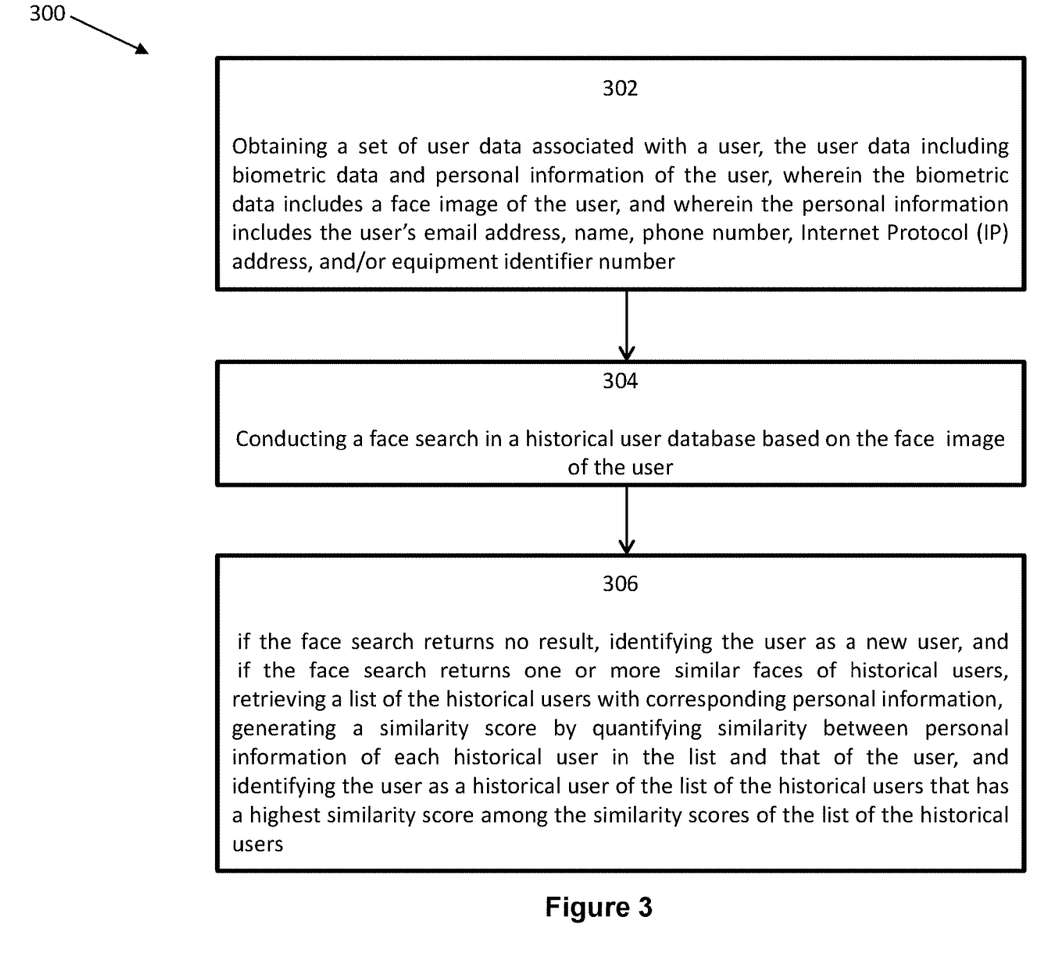
FIG. 3 is a flow chart illustrating a method for user identity verification, according to an embodiment.
Figure 4:
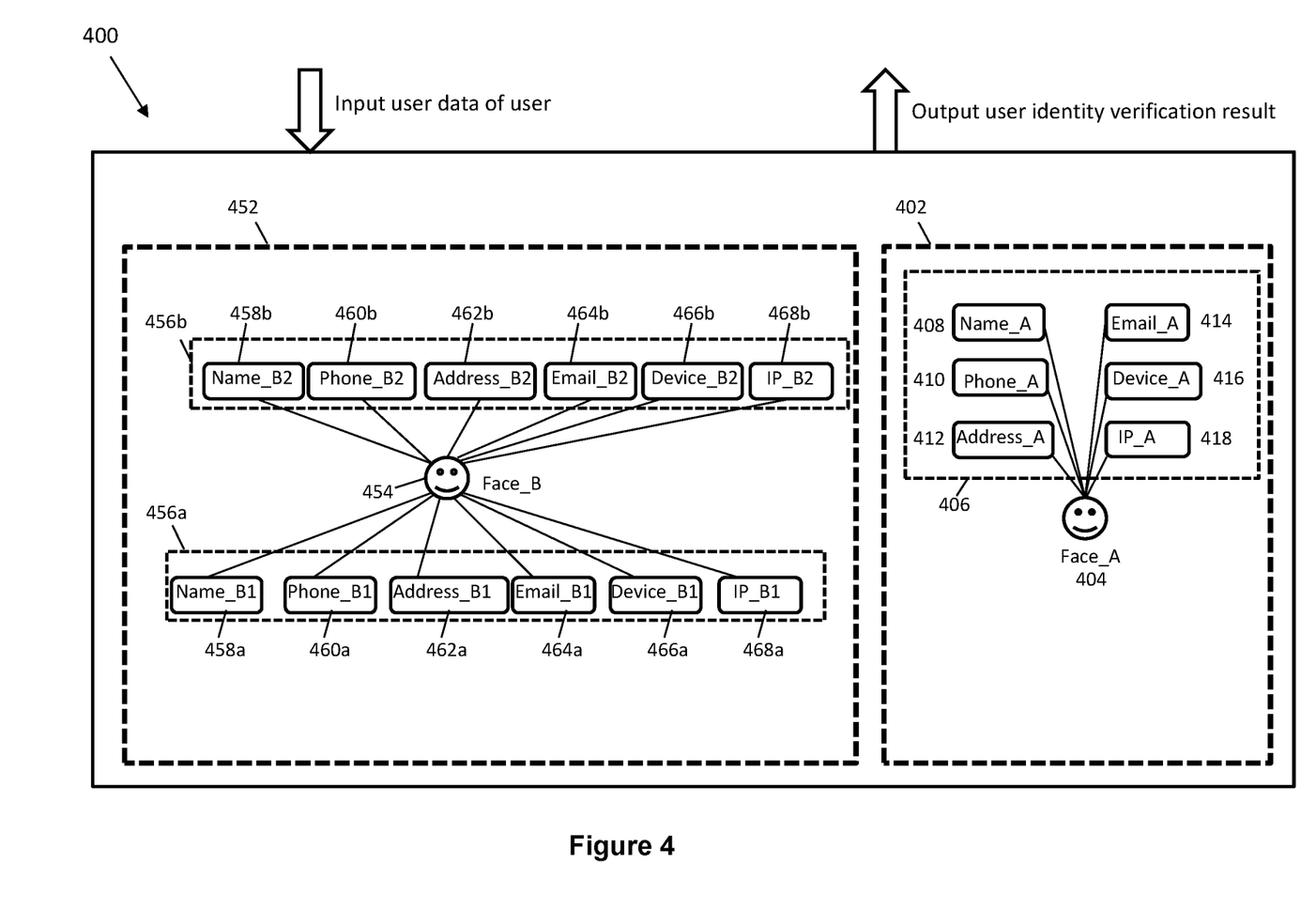
FIG. 4 is an exemplary diagram showing two user identity graphs in a historical user database, according to an embodiment.

Examples of the methods for the user identity verification device 204 to verify a user's identity are depicted in FIGS. 3 to 4. When a user registers an account with the financial service provider, the user identity verification device 204 at the system 200 of the financial service provider is configured at least to perform the following steps as shown in FIG. 3 to verify the user's identity:

- 302: obtain a set of user data associated with a user, the user data including biometric data and personal information of the user, wherein the biometric data includes a face image of the user, and wherein the personal information includes the user's email address, name, phone number, Internet Protocol (IP) address, and/or equipment identifier number;
- 304: conduct a face search in a historical user database based on the face image of the user;
- 306: if the face search returns no result, identify the user as a new user, and if the face search returns one or more similar faces of historical users, retrieve a list of the historical users and corresponding personal information, generate a similarity score by quantifying similarity between personal information of each historical user in the list and that of the user, and identify the user as a historical user of the list of the historical users that has a highest similarity score among the similarity scores of the list of the historical users.

Details of the above steps will be described in the following paragraphs with reference to FIGS. 3 and 4.

Referring back to FIG. 2, the user identity verification device 204 may include a historical user database 208 which stores user data of historical users of the financial service provider or other organisations as mentioned above. The historical users include users who have registered accounts with the financial service provider. These historical users can have respective user profiles stored at the historical user database 208 of the financial service provider.

Each user profile includes a set of user data associated with the respective historical user. For the historical users, the user data is obtained by the user identity verification device 204 when the historical users registered the accounts. The user data includes biometric data and personal information.

In some embodiments, the biometric data can include a face image, an iris image, a voiceprint of the historical user, etc. Such biometric data can be captured by a camera or a microphone of the historical user's device and sent to the user identity verification device 204 as prompted by a request from the user identity verification device 204, or can be uploaded to the user identity verification device 204 from the historical user's digital photo and video album or voice recorder of the historical user's device.

The biometric data stored in the historical user database 208 can be used as machine learning training data for the user identity verification device 204 to learn biometric recognition for subsequent user identity verification.

For example, prior to step 302, the user identity verification device 204 can extract face feature vectors of face images of the historical users in the historical user database 208 using a convolutional neural network (CNN) learning method. It is appreciable to those skilled in the art that other machine learning methods can be used for extracting face feature vectors.

Convolutional neural network (CNN, or ConvNet) is a type of deep learning method. CNN learning models include AlexNet, VGG, LeNet, GoogLeNet, ResNet, etc. Embodiments of the present disclosure use these models to take the face images of the historical users stored in the historical user database 208 as input and learn face pattern from these face images of the historical users.

Face pattern normally include the following face features. It is appreciable to those skilled in the art that the following list of face features is not exhaustive and may include other features based on the practical needs

- eye size;
- skin colour;
- height and width of a face in a face image;
- ratio of the height of the face to the width of the face;
- width of lips of the face;
- height of nose of the face;
- whether wear spectacles;
- width of spectacles;
- hair colour;
- eyebrow colour;
- ear shape;
- etc.

For the CNN learning method to learn face pattern, the above face features are converted to numbers to form a numerical representation of a face. Such a numerical representation of a face is called a face feature vector.

Based on practical needs, a face feature vector may include any number of numeralised face features and these numeralised face features can be in any specific order. For example, a face feature vector may include 512 face features to describe a face. Each of the 512 face features is considered a dimension of the vector. Such a 512-dimension vector can be in the form of a digital array, such as [1, 1, 0, 1, 0, 0, 0, 1, . . . ]. For example, the first digit can be designated to describe eye size, by using 1 for big eyes and 0 for small eyes. The second digit can be designated to describe skin colour, by using 1 for fair skin colour and 0 for dark skin colour. The remaining digits can be designated similarly.

In some embodiments, the user identity verification device 204 uses the CNN learning method to extract face feature vectors of the face images of the historical users. In this manner, face recognition can be learnt by the user identity verification device 204.

Similarly, the user identity verification device 204 can use the CNN learning method to extract iris feature vectors of iris images of the historical users or voice feature vectors from voiceprints of the historical users as an alternative or additional biometric recognition.

Thereafter, the user identity verification device 204 clusters the face feature vectors of the face images to group the historical users into a plurality of historical user clusters. In some embodiments, the user identity verification device 204 uses K-means to cluster the face feature vectors. In this manner, historical users having similar faces will be clustered together and a similarity between two similar face feature vectors can be represented by a distance between the two face feature vectors.

Thereafter, the user identity verification device 204 indexes the plurality of historical user clusters. The indexes of the plurality of historical user clusters can be stored in the user identity verification device 204 to construct a face search index database 210 to facilitate subsequent face search. The face search index database 210 can be constructed as a separate database 210 that is coupled to the historical user database 208. In some alternative embodiments, the face search index database 210 can be constructed as a portion of the historical user database 208.

The above processing of the biometric data of the historical users, e.g. the extracting of face feature vectors of face images of the historical users, the clustering of the face feature vectors, and the storing of the indexes of the plurality of historical user clusters, can be performed by the user identity verification device 204 prior to step 302.

In some embodiments, the personal information can include one or more data attributes, such as the historical user's email address, name, phone number, date of birth, residence address, work address, income source, identification (ID) number, Internet Protocol (IP) address, equipment identifier number of the historical user's device, etc. It is appreciable to those skilled in the art that the above list of personal information is not exhaustive and may include further data attributes.

In some embodiments, the historical user's email address, name, phone number, date of birth, residence address, work address, income source, and ID number can be provided to the user identity verification device 204 by the user. In some embodiments, the IP address and the equipment identifier number of the historical user's device can be captured by a device (not shown) of the system 200 and then forwarded to the user identity verification device 204, or can be directly captured by a device (not shown) of the user identity verification device 204.

In some embodiments, prior to step 302, the user identity verification device 204 can create the user data of the historical users as identity graphs in the historical user database 208. Two exemplary identity graphs 402, 452 are shown in FIG. 4. As shown in FIG. 4, each of the identity graphs 402, 452 can include a face image 404, 454 of a historical user A, B in the historical user database 208 and a subgraph 406, 456a of the historical user A, B based on the personal information of the historical user A, B. The personal information of the historical user A, B includes data attributes such as user A's name 408, user A's phone number 410, user A's residence address 412, user A's email address 414, user A's equipment identifier number 416 of user A's device, user A's IP address 418, user B's name 458a, user B's phone number 460a, user B's residence address 462a, user B's email address 464a, user B's equipment identifier number 466a of user B's device, and user B's IP address 468a.

In scenarios where a historical user B updates his/her personal information such as phone number or email address, the subgraph 456a may be updated to add a data attribute (not shown) to store the updated personal information. Alternatively, a new subgraph 456b may be created based on the updated personal information including data attributes such as user B's updated name 458b, user B's updated phone number 460b, user B's updated residence address 462b, user B's updated email address 464b, user B's updated equipment identifier number 466b of user B's device, and user B's updated IP address 468b for this historical user B and linked to the face image 456 of the historical user B. One or more data attributes in user B's updated personal information in subgraph 456b may be identical to those in user B's personal information in subgraph 456a.

In view of the above, each of the identity graphs can include a face image corresponding to a historical user in the historical user database 208 and one or more subgraphs of the historical user based on the personal information of the historical user.

The above creation of the identity graphs for the historical users can be performed by the user identity verification device 204 prior to step 302.

At step 302, the user identity verification device 204 obtains a set of user data associated with the user that is currently registering an account. Similar to the user data of the historical users, the user data of the user that is currently registering an account includes biometric data and personal information of the user that is currently registering an account. For example, the biometric data can include a face image, an iris image, a voiceprint of the user, etc which can be captured by a camera or a microphone of the user's device and sent to the user identity verification device 204 as prompted by a request from the user identity verification device 204, or can be uploaded to the user identity verification device 204 from the user's digital photo and video album or voice recorder of the user's device.

Similarly, the personal information of the user that is currently registering an account can include one or more data attributes such as the user's email address, name, phone number, date of birth, residence address, work address, income source, identification (ID) number, Internet Protocol (IP) address, equipment identifier number of the user's device, etc. It is appreciable to those skilled in the art that the above list of personal information is not exhaustive and may include further data attributes.

In some embodiments, the user's email address, name, phone number and residence address can be provided to the user identity verification device 204 by the user. In some embodiments, the IP address and the equipment identifier number of the historical user's device can be captured by a device (not shown) of the system 200 and then forwarded to the user identity verification device 204, or can be directly captured by a device (not shown) of the user identity verification device 204.

At step 304, the user identity verification device 204 conducts a face search in the historical user database 208 based on the face image of the user that is currently registering an account.

In some embodiments, when conducting the face search, the user identity verification device 204 is configured to extract a face feature vector of the face image of the user that is currently registering an account. The face feature vector extraction can be done using the CNN learning method that is used for the extraction of the historical users' face feature vectors as described above.

Thereafter, the user identity verification device 204 can search the face feature vector of the face image of the user that is currently registering an account in the face search index database 210.

Based on the search of the face feature vector at the face search index database 210, the user identity verification device 204 can locate one or more similar faces of historical users that have face feature vectors of a highest similarity with that of the user that is currently registering an account. In some examples, as described above, the face feature vectors of a highest similarity may each have a distance below a threshold with the face feature vector of the user that is currently registering an account.

At step 306, if the face search returns no result, the user identity verification device 204 identifies the user as a new user. In this scenario, the user identity verification device 204 can subsequently create an identity graph for the new user by linking a subgraph for the user to the face image of the user. The subgraph for the user can be created in a similar manner as the one or more subgraphs for the historical users as described above and shown in FIG. 4. An account can then be registered for this new user. The identity graph for the new user can be stored into the historical user database 208. The face search index database 210 can be updated to include the face feature vector of the face image of the user.

At step 306, if the face search returns one or more similar faces of historical users, the user identity verification device 204 retrieves a list of these historical users with their corresponding personal information. As described above, the list of historical users having the one or more similar faces may have face feature vectors of a highest similarity with that of the user that is currently registering an account.

With respect to the list of the historical users, the user identity verification device 204 generates a similarity score for each historical user by quantifying similarity between personal information of each historical user in the list and that of the user that is currently registering an account.

In some embodiments of quantifying similarity between personal information of a historical user in the list and that of the user that is currently registering an account, the user identity verification device 204 creates a subgraph for the user based on the personal information of the user. The subgraph for the user can be similar to the one or more subgraphs for the historical users as shown in FIG. 4.

Thereafter, the user identity verification device 204 calculates relevancies of personal information in the subgraph of the user with corresponding personal information in the one or more subgraphs of the historical user. For example, the relevancies can be calculated by determining similarity between respective data attributes in the personal information of the historical user and in the personal information of the user that is currently registering an account. Each of the data attributes in the personal information is assigned with a corresponding weight based on the practical requirements. As such, the relevancies of the personal information are weighted.

Subsequently, the weighted relevancies can be aggregated by the user identity verification device 204 to determine the similarity score for the historical user. For example, the aggregation can be performed by summing the weighted relevancies of each data attribute in the one or more subgraphs of the historical user to determine the similarity score of the historical user, or by calculating average weighted relevancy of each data attribute in the one or more subgraphs of the historical user and combining all the average weighted relevancies to determine the similarity score of the historical user.

After similarity scores for all the historical users in the list have been generated, the user identity verification device 204 identifies the user that is currently registering an account as a historical user of the list of the historical users that has a highest similarity score among the similarity scores of the list of the historical users. In this scenario, the user identity verification device 204 can check the identity graph of the identified historical user to determine the number of accounts that the identified historical user holds in the historical user database 208. If the number of accounts of the identified historical user is below a limit (e.g., 5), the user identity verification device 204 can proceed to register a new account for the identified historical user. Otherwise, the user identity verification device 204 can refuse to register a new account for the identified historical user. The identity graph of the identified historical user can then be updated in the historical user database 208 by linking the subgraph of the user to the face image of the identified historical user. The face image of the user can be included (not shown in FIG. 4) in the identity graph of the identified historical user. The face search index database 210 can be updated to include the face feature vector of the face image of the user.

In some embodiments, the user identity verification device 204 can identify the user as the historical user that has the highest similarity score only when the highest similarity score exceeds a threshold value.

Additionally, when the user identity verification device 204 refuses to register a new account for the identified historical user as the number of accounts of the identified historical user is not less than, e.g. equal to or more than, a limit (e.g., 5), the user identity verification device 204 can flag an abnormality in the identity graph of the identified historical user. The identified historical user and the accounts that he/she holds may be marked as suspicious for close monitoring and risk control management by the financial service provider.

In the above manner, the present devices, methods and systems can accurately verify the same person using different phone numbers or emails addresses to register different accounts with the financial service provider as a same user, even if the different accounts are registered at different points in time. Compared to conventional phone number or email address based identity verifications, the present devices, methods and systems advantageously produce improved identity verification accuracy, which facilitates the financial service provider to automatically recognise suspicious users and accounts in order to reduce risks and avoid frauds.

Based on the identity verification result identified at step 306, the user identity verification device 204 can then transmit 218 the user identity verification result to the user's device 216 via the communication device. The user identity verification result may be in the format of a system notification message together with an indication of whether a new account is registered and if registered, the new account number. It is appreciable to those skilled in the art that the user identity verification result can be in any other format based on practical needs. For example, the user identity verification result can be in the format of a SMS message or an email deliverable to the phone number or email address provided by the user.

FIG. 4 shows two exemplary identity graphs 402, 452 are shown in FIG. 4. The identity graphs 402, 452 can be stored in a historical user database of a user identity verification device 400.

As mentioned above, each of the identity graphs 402, 452 can include a face image 404, 454 of a historical user A, B in the historical user database 208 and one or more subgraphs 406, 456a, 456b of the historical user A, B based on the personal information of the historical user A, B. As shown in FIG. 4, the personal information of the historical user A, B includes data attributes such as user A's name 408, user A's phone number 410, user A's residence address 412, user A's email address 414, user A's equipment identifier number 416 of user A's device, user A's IP address 418, user B's name 458a, user B's phone number 460a, user B's residence address 462a, user B's email address 464a, user B's equipment identifier number 466a of user B's device, and user B's IP address 468a. It is appreciable to those skilled in the art that the personal information shown in FIG. 4 is not exhaustive. For example, the number of accounts that the historical user A, B holds with the financial service provider can be included in the one or more subgraphs 406, 456a, 456b.

In scenarios where the historical user A, B updates his/her personal information such as phone number or email address or has registered a new account, a new subgraph may be created based on the updated personal information for this historical user A, B and linked to the face image 406, 456 of the historical user A, B. Alternatively, the existing subgraphs 406, 456a, 456b of the historical user A, B may be updated to add a data attribute (not shown) to store the updated personal information.

Additionally, in scenarios where a new user is identified as described above and a new account is registered, a new identity graph will be created in the historical user database of the user identity verification device 400. The new identity graph will include biometric data and personal data of the new user, as described above.

Figure 5:
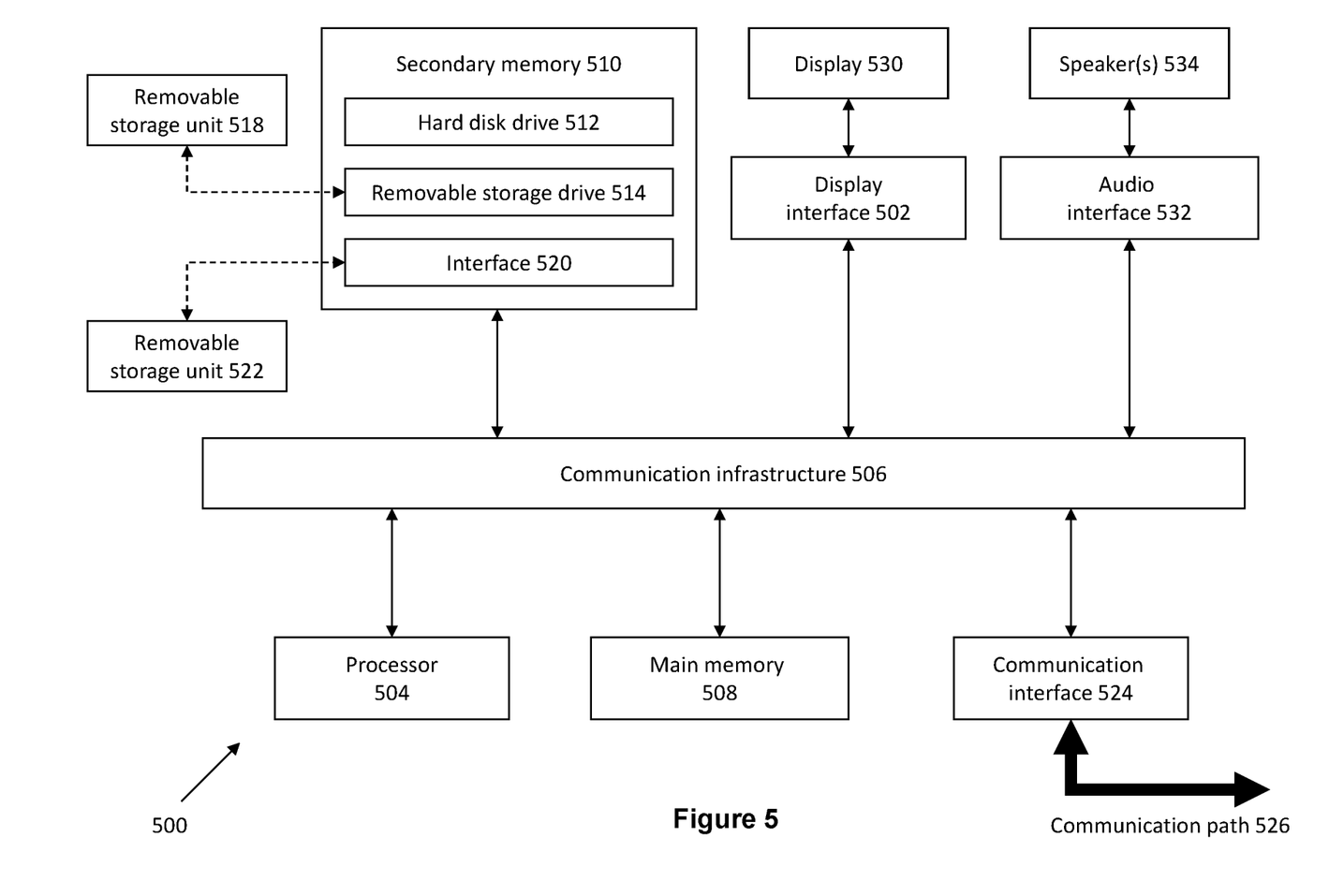
FIG. 5 shows a block diagram of a computer system suitable for use as the example device shown in FIG. 1 and in the example system as shown in FIG. 2 in executing at least some steps of the method for user identity verification in accordance with the embodiments shown in FIGS. 3 to 4.

FIG. 5 shows a block diagram of a computer system suitable for use as the device 100 or the user identity verification device 204, 400 shown in FIGS. 1, 2 and 4, or the system 200 as shown in FIG. 2 in executing at least some steps of the method for user identity verification in accordance with the embodiment shown in FIG. 3.

The following description of the computer system/computing device 500 is provided by way of example only and is not intended to be limiting.

As shown in FIG. 5, the example computing device 500 includes a processor 504 for executing software routines. Although a single processor is shown for the sake of clarity, the computing device 500 may also include a multi-processor system. The processor 504 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a hard disk drive 512 and/or a removable storage drive 514, which may include a magnetic tape drive, an optical disk drive, or the like. The removable storage drive 514 reads from and/or writes to a removable storage unit 518 in a well-known manner. The removable storage unit 518 may include a magnetic tape, optical disk, or the like, which is read by and written to by removable storage drive 514. As will be appreciated by persons skilled in the relevant art(s), the removable storage unit 518 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 520. Examples of a removable storage unit 522 and interface 520 include a removable memory chip (such as an EPROM or PROM) and associated socket, and other removable storage units 522 and interfaces 520 which allow software and data to be transferred from the removable storage unit 522 to the computer system 500.

The computing device 500 also includes at least one communication interface 524. The communication interface 524 allows software and data to be transferred between computing device 500 and external devices via a communication path 526. In various embodiments, the communication interface 524 permits data to be transferred between the computing device 500 and a data communication network, such as a public data or private data communication network. The communication interface 524 may be used to exchange data between different computing devices 500 which such computing devices 500 form part an interconnected computer network. Examples of a communication interface 524 can include a modem, a network interface (such as an Ethernet card), a communication port, an antenna with associated circuitry and the like. The communication interface 524 may be wired or may be wireless. Software and data transferred via the communication interface 524 are in the form of signals which can be electronic, electromagnetic, optical or other signals capable of being received by communication interface 524. These signals are provided to the communication interface via the communication path 526.

Optionally, the computing device 500 further includes a display interface 502 which performs operations for rendering images to an associated display 530 and an audio interface 532 for performing operations for playing audio content via associated speaker(s) 534.

As used herein, the term "computer program product" may refer, in part, to removable storage unit 518, removable storage unit 522, a hard disk installed in hard disk drive 512, or a carrier wave carrying software over communication path 526 (wireless link or cable) to communication interface 524. Computer readable storage media refers to any non-transitory tangible storage medium that provides recorded instructions and/or data to the computing device 500 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 524. Such computer programs, when executed, enable the computing device 500 to perform one or more features of embodiments discussed herein. In various embodiments, the computer programs, when executed, enable the processor 504 to perform features of the above-described embodiments. Accordingly, such computer programs represent controllers of the computer system 500.

Software may be stored in a computer program product and loaded into the computing device 500 using the removable storage drive 514, the hard disk drive 512, or the interface 520. Alternatively, the computer program product may be downloaded to the computer system 500 over the communications path 526. The software, when executed by the processor 504, causes the computing device 500 to perform functions of embodiments described herein.

It is to be understood that the embodiment of FIG. 5 is presented merely by way of example. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

The techniques described in this specification produce one or more technical effects. In particular, the present disclosure advantageously utilises biometric data as a key factor to improve accuracy of users' identity verifications. Based on the biometric based identity verification, one or more similar historical users can be found based on face search. The face search result is then screened by personal information based identity similarity determination. In this manner, the reliability and robustness of the user identity verification are significantly improved by virtue of the devices, systems and methods as described in the present disclosure. Advantageously, a same person using different phone numbers or email addresses to register different accounts with the financial service provider can thus be identified as a same user. Compared to conventional phone number or email address based identity verifications, the present devices, methods and systems produce improved identity verification accuracy, which facilitates the financial service provider to automatically recognise suspicious users and accounts in order to reduce risks and avoid frauds.

It will be appreciated by a person skilled in the art that numerous variations and/or modifications may be made to the present disclosure as shown in the specific embodiments without departing from the scope of the specification as broadly described. The present embodiments are, therefore, to be considered in all respects to be illustrative and not restrictive.

The invention claimed is:

1. A computer-implemented method comprising:
obtaining user data associated with a first user, the user data comprising biometric data associated with the first user and personal information of the first user,
wherein the personal information includes one or more of an email address of the first user, a name of the first user, a phone number of the first user, an Internet Protocol address of a device associated with the first user, and an equipment identifier number of a device associated with the first user;
conducting a biometric similarity search in a historical user database based on the biometric data;
determining, based on the biometric similarity search, that multiple historical users have similar biometric data to the first user;
retrieving corresponding personal information of each of the multiple historical users;
generating a respective personal information similarity score for each of the multiple historical users, each personal information similarity score indicating a personal information similarity between the historical user and the first user; and
identifying, as the first user, a historical user of the multiple historical users, the personal information similarity score corresponding to the identified historical user indicating a higher similarity than the personal information similarity scores corresponding to other historical users of the multiple historical users.

2. The method of claim 1, comprising:
extracting biometric feature vectors from biometric data of historical users in the historical user database using a convolutional neural network learning method;
clustering the biometric feature vectors to group the historical users into a plurality of historical user clusters; and
constructing a biometric search index database based on the plurality of historical user clusters.

3. The method of claim 2, wherein conducting the biometric similarity search comprises:
extracting a biometric feature vector of the first user from the biometric data associated with the first user using the convolutional neural network learning method;
searching for similar biometric feature vectors to the biometric feature vector of the first user in the biometric search index database; and
locating the multiple historical users in the biometric search index database, wherein the multiple historical users have biometric feature vectors with at least a threshold similarity to the biometric feature vector of the first user.

4. The method of claim 1, comprising:
creating respective identity graphs for historical users in the historical user database based on respective user data of the historical users,
wherein each identity graph includes biometric data corresponding to the historical user and one or more subgraphs comprising personal information of the historical user.

5. The method of claim 4, wherein determining the respective personal information similarity between the personal information of each of the multiple historical users and the personal information of the first user comprises:
creating a subgraph for the first user based on the personal information of the first user;
calculating categorical similarities between categories of personal information in the subgraph of the first user and corresponding categories of personal information in a subgraph of the historical user,
weighting each categorical similarity based on a relevance of the corresponding category; and
aggregating the weighted categorical similarities to determine the respective personal information similarity.

6. The method of claim 5, comprising:
receiving an account registration request for the first user;
determining a number of accounts that the identified historical user holds in the historical user database; and
in response to the number of accounts being less than a limit, registering a new account for the identified historical user and linking the subgraph for the first user to biometric data of the identified historical user; or
in response to the number of accounts being not less than the limit, refusing to register a new account for the identified historical user and flagging an abnormality in an identity graph of the identified historical user.

7. The method of claim 1, wherein the biometric data associated with the first user comprises one or more of a facial image, an iris image, and a voiceprint.

8. A non-transitory, computer-readable medium storing one or more instructions executable by a computer system to perform one or more operations comprising:
obtaining user data associated with a first user, the user data comprising biometric data associated with the first user and personal information of the first user,
wherein the personal information includes one or more of an email address of the first user, a name of the first user, a phone number of the first user, an Internet Protocol address of a device associated with the first user, and an equipment identifier number of a device associated with the first user;
conducting a biometric similarity search in a historical user database based on the biometric data;
determining, based on the biometric similarity search, that multiple historical users have similar biometric data to the first user;
retrieving corresponding personal information of each of the multiple historical users;
generating a respective personal information similarity score for each of the multiple historical users, each personal information similarity score indicating a personal information similarity between the historical user and the first user; and
identifying, as the first user, a historical user of the multiple historical users, the personal information similarity score corresponding to the identified historical user indicating a higher similarity than the personal information similarity scores corresponding to other historical users of the multiple historical users.

9. The computer-readable medium of claim 8, wherein the operations comprise:
extracting biometric feature vectors from biometric data of historical users in the historical user database using a convolutional neural network learning method;
clustering the biometric feature vectors to group the historical users into a plurality of historical user clusters; and
constructing a biometric search index database based on the plurality of historical user clusters.

10. The computer-readable medium of claim 9, wherein conducting the biometric similarity search comprises:
extracting a biometric feature vector of the first user from the biometric data associated with the first user using the convolutional neural network learning method;
searching for similar biometric feature vectors to the biometric feature vector of the first user in the biometric search index database; and
locating the multiple historical users in the biometric search index database, wherein the multiple historical users have biometric feature vectors with at least a threshold similarity to the biometric feature vector of the first user.

11. The computer-readable medium of claim 8, wherein the operations comprise:
creating respective identity graphs for historical users in the historical user database based on respective user data of the historical users,
wherein each identity graph includes biometric data corresponding to the historical user and one or more subgraphs comprising personal information of the historical user.

12. The computer-readable medium of claim 11, wherein determining the respective personal information similarity between the personal information of each of the multiple historical users and the personal information of the first user comprises:
creating a subgraph for the first user based on the personal information of the first user;
calculating categorical similarities between categories of personal information in the subgraph of the first user and corresponding categories of personal information in a subgraph of the historical user;
weighting each categorical similarity based on a relevance of the corresponding category; and
aggregating the weighted categorical similarities to determine the respective personal information similarity.

13. The computer-readable medium of claim 12, wherein the operations comprise:
receiving an account registration request for the first user;
determining a number of accounts that the identified historical user holds in the historical user database; and
in response to the number of accounts being less than a limit, registering a new account for the identified historical user and linking the subgraph for the first user to biometric data of the identified historical user; or
in response to the number of accounts being not less than the limit, refusing to register a new account for the identified historical user and flagging an abnormality in an identity graph of the identified historical user.

14. The computer-readable medium of claim 8, wherein the biometric data associated with the first user comprises one or more of a facial image, an iris image, and a voiceprint.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
obtaining user data associated with a first user, the user data comprising biometric data associated with the first user and personal information of the first user,
wherein the personal information includes one or more of an email address of the first user, a name of the first user, a phone number of the first user, an Internet Protocol address of a device associated with the first user, and an equipment identifier number of a device associated with the first user;
conducting a biometric similarity search in a historical user database based on the biometric data;
determining, based on the biometric similarity search, that multiple historical users have similar biometric data to the first user;
retrieving corresponding personal information of each of the multiple historical users;
generating a respective personal information similarity score for each of the multiple historical users, each personal information similarity score indicating a personal information similarity between the historical user and the first user; and
identifying, as the first user, a historical user of the multiple historical users, the personal information similarity score corresponding to the identified historical user indicating a higher similarity than the personal information similarity scores corresponding to other historical users of the multiple historical users.

16. The computer-implemented system of claim 15, wherein the operations comprise:
- extracting biometric feature vectors from biometric data of historical users in the historical user database using a convolutional neural network learning method;
- clustering the biometric feature vectors to group the historical users into a plurality of historical user clusters; and
- constructing a biometric search index database based on the plurality of historical user clusters.

17. The computer-implemented system of claim 16, wherein conducting the biometric similarity search comprises:
- extracting a biometric feature vector of the first user from the biometric data associated with the first user using the convolutional neural network learning method;
- searching for similar biometric feature vectors to the biometric feature vector of the first user in the biometric search index database; and
- locating the multiple historical users in the biometric search index database, wherein the multiple historical users have biometric feature vectors with at least a threshold similarity to the biometric feature vector of the first user.

18. The computer-implemented system of claim 15, wherein the operations comprise:
- creating respective identity graphs for historical users in the historical user database based on respective user data of the historical users,
  - wherein each identity graph includes biometric data corresponding to the historical user and one or more subgraphs comprising personal information of the historical user.

19. The computer-implemented system of claim 18, wherein determining the respective personal information similarity between the personal information of each of the multiple historical users and the personal information of the first user comprises:
- creating a subgraph for the first user based on the personal information of the first user;
- calculating categorical similarities between categories of personal information in the subgraph of the first user and corresponding categories of personal information in a subgraph of the historical user,
- weighting each categorical similarity based on a relevance of the corresponding category; and
- aggregating the weighted categorical similarities to determine the respective personal information similarity.

20. The computer-implemented system of claim 19, wherein the operations comprise:
- receiving an account registration request for the first user;
- determining a number of accounts that the identified historical user holds in the historical user database; and
- in response to the number of accounts being less than a limit, registering a new account for the identified historical user and linking the subgraph for the first user to biometric data of the identified historical user; or
- in response to the number of accounts being not less than the limit, refusing to register a new account for the identified historical user and flagging an abnormality in an identity graph of the identified historical user.

21. The computer-implemented system of claim 15, wherein the biometric data associated with the first user comprises one or more of a facial image, an iris image, and a voiceprint.

* * * * *